April 10, 1956     E. E. AYLOR     2,741,473
SCALE
Filed Oct. 31, 1949     2 Sheets-Sheet 1
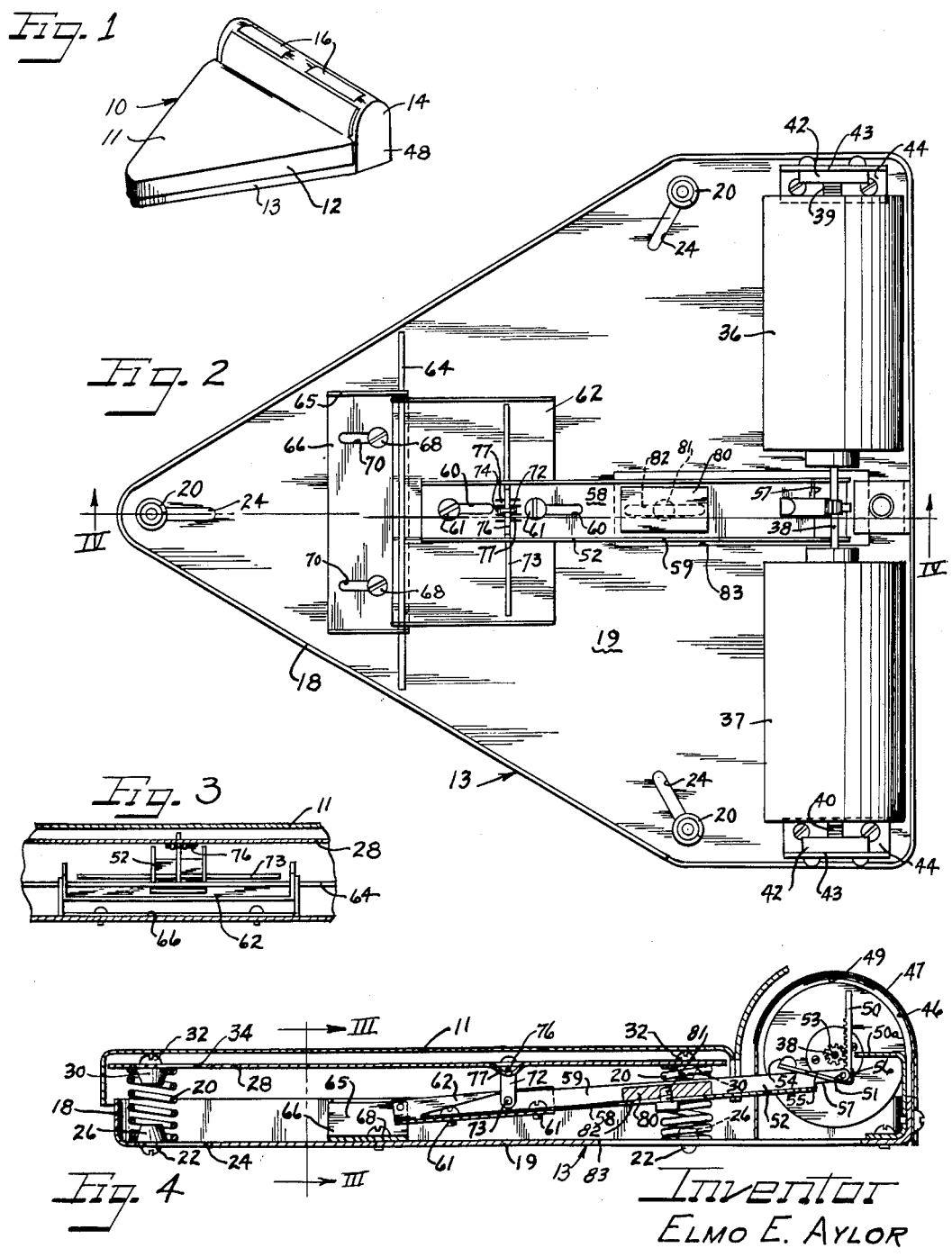
Inventor
ELMO E. AYLOR
by Robert J. Newman
Francis W. Anderson Attys.

April 10, 1956     E. E. AYLOR     2,741,473
SCALE
Filed Oct. 31, 1949     2 Sheets-Sheet 2
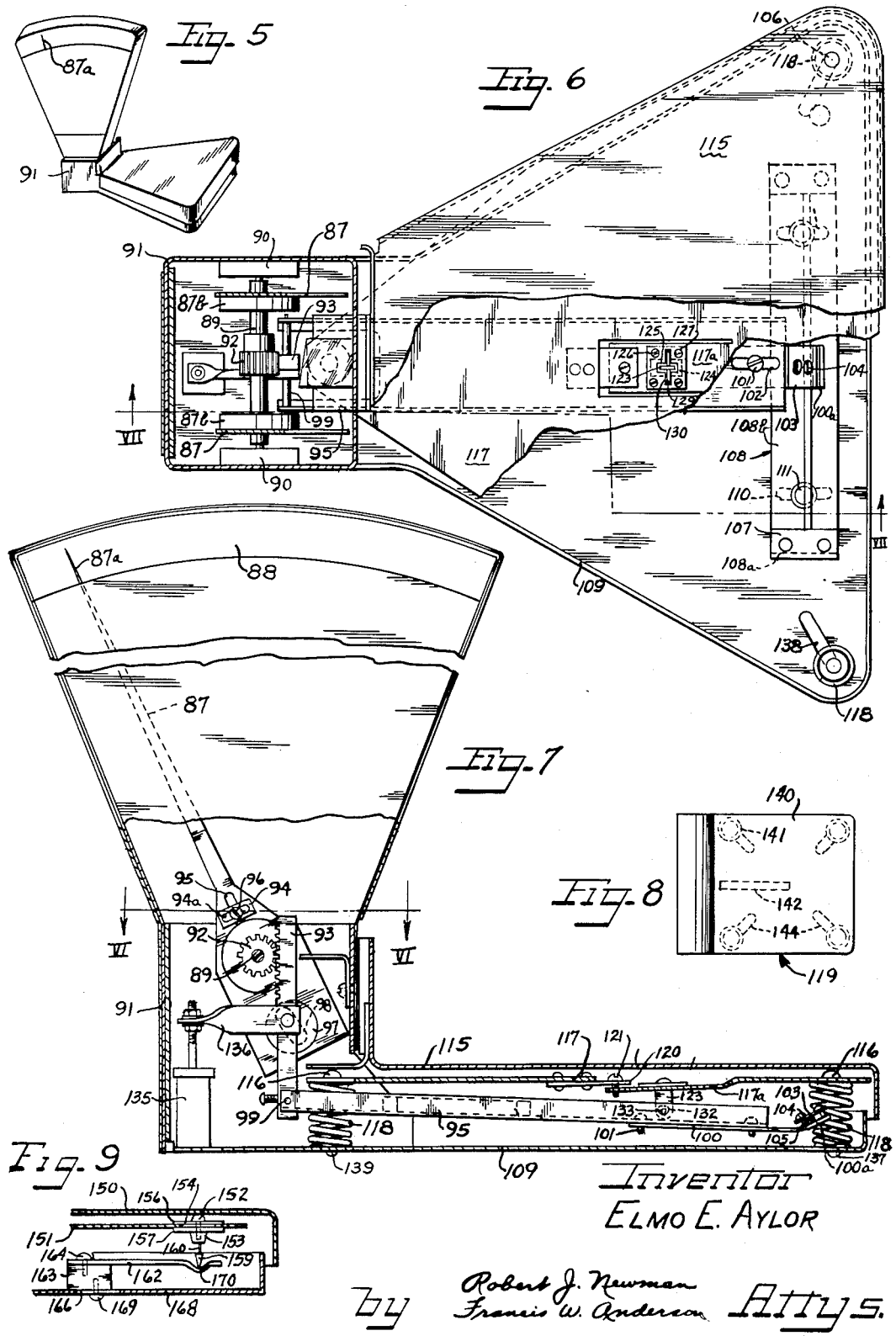
Inventor
ELMO E. AYLOR
by Robert J. Newman
Francis W. Anderson Attys.

United States Patent Office 2,741,473
Patented Apr. 10, 1956

2,741,473

SCALE

Elmo E. Aylor, Chicago, Ill.

Application October 31, 1949, Serial No. 124,629

13 Claims. (Cl. 265—68)

This invention relates to improvements in a scale. More particularly it has to do with a platform type of scale in which the platform is supported directly or indirectly on springs and a lever, which transmits the downward movement of the platform to the weight indicating linkage, is connected at the center of the spring system.

In platform type scales it is required by law that the weight reading be constant, within certain limits, for a standard object no matter on what part of the scale the object is placed. This requirement has, to a large extent, eliminated the use of a platform scale employing coil springs in the manner described, especially in installations where accuracy is required such as scales used in the ordinary meat market or delicatessen store. This is due to the fact that it is difficult to obtain a number of springs having exactly the same weight bearing characteristics, a condition that is necessary, (unless otherwise compensated), to eliminate the possibility of varying weight readings when the load is put on different parts of the platform.

With the foregoing in mind, it is an important object of the present invention to provide a platform type of scale wherein the platform is suported directly on springs and the arm used to transmit the downward movement of the platform to the indicating linkage is connected to the platform at the "weighted geometric center" of the spring system.

The term "weighted geometric center," as used hereinafter, encompasses the idea that in a spring system having, for example, three springs, when an object to be weighed is placed over any one spring the scale platform will pivot downwardly under the load using the other two springs as pivot points. The spring under the load will deflect according to its capacity to bear the load, the weaker the spring the more deflection for a given load. Therefore, in order that the deflection at the movement transmitting lever be same no matter which spring is under the load, it is necessary that weaker springs be placed farther away from the deflecting lever. Conversely, stronger springs should be placed closer to the transmitting arm. This point at which the movement transmitting lever is attached to the platform will hereinafter be referred to as the "weighted geometric center." If the three springs are of equal strength and are spaced in such a manner that they form a triangle, the geometrical center and the weighted geometric center of the triangle will coincide. The movement transmitting lever is connected at this point. If the springs are of unequal strengths, the geometrical center and the weighted geometric center of the triangle will not correspond and the point of attachment of the movement transmitting lever will not be at the geometrical center. Hence, provision has been made for moving each of the springs toward or away from the point of attachment in order to bring the weighted geometric center of the new triangle into coincidence with the point of attachment of the deflecting arm.

When three springs of equal characteristics are used to support the subplatform and a load L is placed at the geometric center of the spring system and on the top platform, each spring will deflect X distance, allowing the subplatform to move down X distance while maintaining a fixed angular relationship to the horizontal. However, if load L is moved to a point directly over any one spring, that spring will deflect 3X distance and the two other springs will act as pivot points for the subplatform, their effective length remaining constant.

The geometric center is then $$\frac{D}{3}$$

distance from a line (pivot line) joining the pivot points, where D represents the distance from the pivot line to the center of the spring under load. Therefore, the geometric center on the subplatform will move down ⅓ the distance of the spring deflection and this amount is $$\frac{3X}{3}$$

or X distance.

Accordingly, another object of the present invention is to provide a scale having a platform supported by springs and a movement transmitting lever at the weighted geometric center of the spring system and providing means for adjusting the position of any spring relative to the weighted geometric center in order that this center may be kept at the same point even though the springs vary in weight bearing characteristics.

A further object of the present invention is to provide a scale having means for adjusting the weight indicating linkage mechanism to coordinate the scale readings with the actual weight being measured.

A still further object of the present invention is to provide a scale that is accurate in operation and economical to manufacture.

According to the general features of the present invention there is provided a scale having a platform supported directly on three similar coil springs, which are equidistant from each other. A link pivotally attached to the platform at the weighted geometric center of the spring system is connected at its lower end to a linkage including a rack and pinion for transmitting the downward movement of the platform to the weight indicating drum of the scale.

An important feature of the present invention resides in the provision of slots in the platform and in the base of the scale to permit the springs to be adjusted toward or away from the weighted geometric center.

Other and further features, objects and advantages of the present invention will be apparent to those skilled in the art from the following detailed description taken in connection with the accompanying drawings.

On the drawings:

Figure 1 is a perspective view of a platform type scale constructed according to the teachings of the present invention;

Figure 2 is a top plan view of the scale of Figure 1 with the upper platform and cover members removed to more clearly disclose the mechanism;

Figure 3 is a fragmentary vertical sectional view taken on line III—III of Figure 4;

Figure 4 is a vertical sectional view taken on line IV—IV of Figure 2;

Figure 5 is a perspective view of a second embodiment of a scale constructed according to the teachings of the present invention;

Figure 6 is a plan view, with parts in section and parts broken away to expose the mechanism, of the scale of Figure 5, the portion shown in section being taken along lines VI—VI of Fig. 7;

Figure 7 is a vertical sectional view taken along the line VII—VII of Figure 6; and Figure 8 is a more or less diagrammatic showing of a third modification of the present invention.

Figure 9 is a fragmentary vertical sectional view showing a flat spring installation.

As shown on the drawings:

In Figure 1 the reference numeral 10 indicates generally a scale including a platform 11 having a front and side skirt portion 12 overlapping in spaced relation to a base assembly 13. An upstanding, rounded hood or cover portion 14 is supported from the base assembly 13, providing windows 16 through which may be seen the weight calibrations on the indicating drum.

In Figure 2 the scale is illustrated with the load-receiving platform, the subplatform and the hooded portion 14 removed. It is seen that a flange 18 projects upwardly from the bottom plate 19 of the base assembly 13 around the entire periphery of the plate. Coil springs 20 are positioned at three points just inside the flange 18. Cap-screws 22, Figure 4, projecting upwardly through slots 24 in the base plate 19, are threaded into lower positioning blocks 26. The slots 24 are provided at each corner of the plate 19 and extend inwardly toward the center of the triangle defined by the three springs. Thus, each spring may be independently adjusted toward or away from the common center in the slots by shifting the positioning blocks.

The springs 20 are so constructed that each coil will remain clear of adjacent coils to prevent the spring load from varying with the load. In a preferred embodiment the middle coils are smaller in diameter than the end coils.

A subplatform 28 is supported on the upper end of the springs 20, being positioned relative thereto by means of upper positioning blocks 30 each of which is held in place by a cap screw 32 and projects downwardly into one of the springs. Slots 34 are provided in the subplatform 28 parallel to the slots 24 in the base plate 19 and equal in extent. Thus, the upper ends of the springs 20 are also mounted for sliding adjustment toward or away from the center of the spring system. It will be understood that, when a spring member 20 is adjusted, it is moved an equal distance in both the upper slot 34 and the lower slot 24.

It is to be noted in Figure 4 that the platform 11 rests directly on the heads of the cap screws 32 and that the head portion transmits the weight to the subplatform 28 and then to the coil springs 20. This prevents deflection of platform 28 as load is applied to platform 11.

The weight of an object placed on the platform 11 is indicated on a pair of drums 36 and 37 which have a common integral center shaft 38, Figure 2, which is journaled in bearing blocks 42 secured to upstanding flanges 43 of angle members 44 attached to the plate 19. Spacer washers 39 and 40 are disposed on the shaft 38 between each drum and the block 42.

The hood assembly 14, which overlies the drums 36 and 37, comprises a U-shaped member 46 which extends the entire width of the scale and receives at each end an end plate 48, Figure 1, which may be brazed or welded thereon.

The slots 16 through which the rotating drums 36 and 37 may be viewed are cut through member 46. A glass plate 49 is suitably secured to the underside of the member 46 providing a window for the openings 16.

The drums 36 and 37 are rotated by means of a rack 50 which is pivotally mounted on a rod 51 connected to a channel-shaped member 52 and is in mesh with a pinion 53 secured to the shaft 38. The rack 50 is disposed for movement in a substantially vertical direction and is urged into mesh with the pinion 53 by a counterweight 54 secured at the end of an arm 55. This arm 55 extends through an opening 57 in the bottom wall 58 of the channel-shaped member 52 and has an end portion 56 hooked under the pivot rod 51 for securement to the rack 50. The weight 54 at all times tends to rotate the rack 50 counterclockwise around the pivot rod 51.

The channel-shaped member 52 has side flanges 59 extending upwardly from the bottom wall 58. Member 52 also is provided with slots 60, Figure 2, for adjustable connection by screws 61 to a relatively wide channel member 62 which is pivotally mounted at its side flanges on a rod 64 journaled at the upper portion of side flanges 65 of a channel member 66. The member 66 is adjustably secured to the bottom plate 19 by screws 68 which extend through slots 70 in the bottom wall of the member 66 for threaded engagement in the plate 19. The channel-shaped members 52 and 62, when secured by screws 61, constitute the movement transmitting lever.

A link 72 is provided to transmit the downward movement of the subplatform 28 to the pivoting lever 52. This link 72 is pivotally mounted at its lower end on a pin 73 suitably journalled between the side flanges 59 of the channel member 52. The upper end of the link 72 projects through a slot 74 in the subplatform 28 and extends thereabove for pivoting movement on a pin 76 which is supported between two indented portions 77 and the lower surface of the subplatform 28.

As previously mentioned, the motion transmitting link 72 is located at the geometric center of the triangle defined by the springs 20. As long as the weight bearing characteristics of all of the springs remain equal, the motion transmitting link 72 in the slot 74 will be at the geometric center of the triangle defined by the springs 20. If one spring becomes out of adjustment or is weaker than the other two and it becomes necessary to shift its location, the position of the link 72 will then represent the weighted geometric center of the spring system.

The channel member 66 is adjustably secured to the bottom plate 19 so that the effective length of the motion transmitting lever can be regulated to control the amount of rotation of the drums 36 and 37 under any given load. It is necessary, however, in adjusting the length of the motion transmitting lever to keep the motion transmitting link 72 in the same position. Therefore, the channel member 52 is also adjustably mounted on the channel member 62. Thus, if it is necessary to shorten the effective length of the motion transmitting lever by moving the pivot rod 64 closer to the drums 36 and 37, the set screws 61 and 68 are each backed away from tight engagement in their associated slot. The unit, comprising the channel members 66 and 62, the pivot rod 64, is moved toward the drum. When the required adjustment has been made, the set screws 68 are screwed tightly down on the member 66 and the set screws 61 are screwed down on the arm 52. It is to be particularly noted that the arm 72 and the channel member 52 have not changed in position during the adjustment.

In order to always maintain a tension on the subplatform 28, and to provide a means for zero load balancing adjustment, a block 80 is adjustably secured to the bottom wall 58 of the channel member 52 by means of a set screw 81 which projects through a slot 82 in the bottom wall. This set screw is accessible through an opening 83 in the bottom plate 19.

From the foregoing description it is seen that there is provided in this invention a simple, efficient scale that will accurately indicate the weight of an object no matter on what part of the scale platform the object is positioned. Further, there is disclosed means for adjusting the positions of the coil springs used in the scale and means for varying the effective length of the motion transmitting lever without changing the location of the motion transmitting link.

In Figures 5, 6, and 7 a modification of the scale of this invention is illustrated. This scale is of the type generally known as a "fan type scale" and includes a pair of spaced indicating arms 87 having upper ends 87a arranged to travel across a suitably calibrated chart 88. The chart and the viewing window for the chart may be of any standard type.

The arms 87 may be made of relatively thin stock and may be secured to hub members 87b that are keyed to a shaft 89. This shaft 89 is journalled to the inside wall of the casing 91. A pinion 92, in mesh with a rack 93, is keyed to the shaft 89 causing pivoting of the indicating arms 87 in response to movement of the rack.

A weight 94 is adjustably mounted on each arm 87 in cross-slots 94a and 95 by a bolt 96. A counterweight 97 is adjustably mounted in a slot 98 at the lower end of each arm 87 by means of a bolt (not shown). These weights are used for calibration purposes to compensate for the arc movement of the lower end of the rack 93 and for out of true conditions of the pinion 92.

At its lower end the rack 93 is pivotally mounted on a pivot rod 99 secured at the free end of a channel member 95. This member is adjustably secured to a strap 100 by capscrews 101 that are disposed in slots 102 of the member 95 and are threaded into the strap 100. The strap 100 has an upwardly inclined end portion 100a to which a clamping plate 103 is secured by capscrews 104. A torsion bar 105 is secured between the clamping plate 103 and the end portion 100a intermediate its ends, as seen in Figure 6. The torsion bar is also gripped at its ends between a clamping plate 107 and an elevated portion 108a of a plate 108 that has a body 108b lying flat against the bottom plate 109 of the scale assembly. The plate 108 is adjustable in slots 110 of the bottom plate 109 by capscrews 111.

The torsion bar 105 thus takes the place of the pivot rod 64 of Figure 2 and provides means for pivotally mounting the motion transmitting member 95.

A load receiving platform 115 rests on the heads of capscrews 116 which transmit the load through a subplatform 117 to three coil springs 118. The subplatform 117 is generally triangular in configuration and has a central downwardly deflected tab 117a that underlies a bracket 120 riveted to the bottom of the plate 117. A screw 121 is threaded into both the tab 117a and the bracket 120 providing a means for adjusting the level of the tab relative to the plate 117. As will be explained hereinafter this adjustment screw 121 provides an efficient means for adjusting the zero balance of the scale.

The downward movement of the subplatform 117 is transmitted to the motion transmitting lever 95 by a link 123 that extends through aligned openings 124 and 125 in the tab 117a and in a plate 126 secured to the tab 117a by screws 127. A pivot pin 129 fits through an opening in the upper end of the link 123 and lies in a transverse slot 130 in the plate 126. At its lower end the link 123 has an opening 132 through which a knife edge 133 is disposed. The knife edge 133 is secured in the walls of the lever 95 and provides a pivot point for the link 123. It will be understood of course that the pull of the link 123 holds the pivot pin 129 in the slot 130.

In operation, when a load is placed on the platform 115, the subplatform 117 is pressed down causing downward pivoting movement of the link 123 and the motion transmitting lever 95. The rack 93 rotates the pinion 92 and moves the indicating arm accordingly.

A dash pot 135 may be connected to the rack 93 by an arm 136 to aid in holding the rack and pinion in engagement.

To adjust the zero balance of the scale it is necessary only to rotate the adjusting screw 121 causing the tab 117 to flex toward or away from the subplatform 117, thus causing the lever 95 to pivot slightly.

Capscrews 139 pass freely through slots 138 in the base plate 109 and into positioning blocks (not shown) for adjustably mounting the springs 118.

It will of course be understood that the same theory of operation and adjustment applies to the scale of Figures 5, 6 and 7 as was described in connection with the scale of Figures 1, 2, 3 and 4.

Figure 8 is a diagrammatic showing of the platform 140 of a scale with four coil springs 141 spaced to form a perfect square. These springs are positioned between the sub-platform and the bottom plate of the scale assembly. According to the teaching of the present invention, if a movement transmitting lever 142, suitably connected to an indicating linkage (not shown) is pivotally secured to the platform 140 at the geometric center of the square, this scale will then accurately indicate the weight of an object no matter at what point on the platform the weight is positioned.

Further, if slots 144 are provided in the sub-platform and in the bottom plate which permit adjustment of the springs toward and away from the center of the square, an adjustment of the spring position relative to the movement transmitting lever connection may be made to accommodate varying spring characteristics.

In Figure 9, a flat spring installation is illustrated. This flat spring may be used in either of the two scales previously described as a substitute for the coil springs therein. In this installation the load placed on the platform 150 is transmitted to a subplatform 151 by means of a screw 152 that is threaded into a block 153. The screw 152 passes through an opening 154 in the subplatform 151 and is held therein by washers 156 and 157. A knife edge 159 is secured to the block 153 by a flexible arm 160.

The flat spring 162 is secured to a block 163 by a screw 164. The block 163 is slidably adjustable in a slot 166 in the bottom plate 168 of the scale by means of a screw 169. The spring 162 has a detent portion 170 that receives the edge of the knife edge 159 permitting pivoting contact therebetween to accommodate movements of the flexible arm 160 in response to movements of the spring.

It will be understood that modifications and variations may be effected without departing from the novel concepts of the present invention.

I claim as my invention:

1. A scale comprising a base, a spring system defined by a plurality of spring members spaced in a uniform geometric pattern on said base, a load-receiving platform supported on said springs, a load-indicating mechanism connected to said platform at the geometric center of said spring system, and means mounting the springs of said system for adjusting movement on said base toward or away from the point of connection of said load-indicating mechanism to said platform to establish said point as the weighted geometric center of the spring system.

2. A scale according to claim 1 wherein said indicating mechanism comprises a drum rotatably mounted on said base, a lever pivotally connected at one end to said base and operatively connected at the other end to said drum to rotate said drum during pivoting of said lever, a link pivotally secured at one end to said platform at the geometric center of the pattern defined by said springs and pivotally connected at the other end to said lever, and means for adjusting the effective length of said lever without shifting the position of said link.

3. A scale comprising a base, a plurality of springs spaced in a uniform geometric pattern on said base, a load-receiving platform supported on said springs, an indicating mechanism connected to said platform and movable therewith to indicate the load, and means securing said springs to said platform for adjusting movement in a direction toward or away from the point of connection of said indicating mechanism and said platform.

4. A scale according to claim 3 wherein said plurality of springs comprises four coil springs disposed to define a square.

5. A scale according to claim 3 wherein said indicating mechanism comprises a drum rotatably mounted on said base, and a lever pivoted on said base and operatively connected between said platform and said drum for converting the downward movement of said platform to rotary movement of said drum.

6. A scale according to claim 3 wherein said indicating mechanism comprises a drum rotatably mounted on said base, a channel member adjustably secured to said base, a lever pivotally secured at one end to said adjustable channel member and operatively connected at the other end to said drum to rotate said drum during pivoting of said lever, and a motion transmitting link pivotally connected to said lever and to said platform.

7. A scale comprising a base having a plurality of slots therein the projections of which intersect at a common point, a spring system defined by a plurality of springs mounted in a uniform geometric pattern in the slots of said base for adjustable directed movement toward or away from said common point a load-receiving platform supported on said springs and an indicating mechanism connected to said platform at said point.

8. A scale comprising a base, a plurality of springs mounted on said base in a uniform geometric pattern, each spring having a flat body portion with an indented end portion, a load-receiving platform spaced above said springs, a plurality of arms depending from said platform, each arm having a knife edge disposed in an indented end portion of one of said springs for supporting said platform from said springs, an indicating mechanism connected to said platform and movable therewith to indicate the load, and means securing said springs to said platform for adjusting movement in a direction toward or away from the point of connection of said indicating mechanism and said platform.

9. A scale comprising a base, spaced supports secured to and extending upwardly from said base, a torsion bar secured adjacent its end portions to said supports, a pivoting lever structure spaced above said base and having one end portion secured to the torsion bar intermediate its ends, an indicating mechanism connected to said pivoting lever, a plurality of springs mounted on said base, a load-receiving platform supported on said springs, and means interconnecting said pivoting lever structure to said platform, whereby movement of said platform under load causes pivoting of said lever structure, said means including a subplatform operatively connected to said load-receiving platform for movement therewith and having a deflectible tab, a link pivotally connected between said tab and said pivoting lever, and adjustable means connected between said subplatform and said tab for deflecting said tab to adjustably pivot said lever.

10. A scale comprising a baseplate, a platform spaced above said baseplate, a spring mounting on said baseplate supporting said platform, a weight indicating linkage pivotally connected to said baseplate having an arm portion extending below said platform, a tab bent downwardly from said platform immediately above said arm portion, a link pivotally connected to said tab and to said arm, an adjusting screw disposed between said platform and said bent down tab for adjusting the distance therebetween and causing pivoting movement of said arm portion to effect a zero balance of said scale.

11. A scale comprising a baseplate, a platform spaced above said baseplate, three coil springs disposed between said platform and said baseplate, an indicating means mounted on said baseplate, a linkage connected at the geometric center of the triangle defined by said springs and associated with said indicating means for transmitting the downward movement of said platform to said indicating means, said platform and said baseplate having slots therein, means adjustably mounting said springs in the slots of said baseplate and said platform, said slots being arranged to permit said springs to be shifted toward or away from said geometric center to compensate for variations in said springs.

12. A scale comprising a baseplate, a platform spaced above said baseplate, a plurality of coil springs disposed in a geometric pattern between said platform and said baseplate, an indicating means mounted on said baseplate, a linkage connected to said platform at the geometric center of said plurality of springs and operatively connected to said indicating means for transmitting the downward movement of said platform to said indicating means, said platform and said baseplate having slots therein, means adjustably mounting said springs in the slots of said baseplate and said platform, said slots being arranged to permit said springs to be shifted toward or away from said geometric center to compensate for variations in said springs.

13. A scale comprising a load-receiving platform having a plurality of slots whose projections intersect at a common point, a plurality of springs mounted in supporting relation beneath said platform, a weight indicating mechanism pivotally mounted on said platform at said point, and means for adjustably securing each spring in one of said slots to permit selective adjusting movement of each spring toward said point.

References Cited in the file of this patent

UNITED STATES PATENTS

| 508,507 | Dickson | Nov. 14, 1893 |
| 988,895 | Philippi | Apr. 4, 1911 |
| 990,597 | Rowland | Apr. 25, 1911 |
| 993,647 | Burnett | May 30, 1911 |
| 1,928,065 | Litle | Sept. 26, 1933 |
| 1,946,775 | Zwickl | Feb. 13, 1934 |
| 1,965,302 | Wagner | July 3, 1934 |
| 2,039,527 | Garbell | May 5, 1936 |
| 2,039,528 | Garbell | May 8, 1936 |
| 2,073,912 | Walker | Mar. 16, 1937 |
| 2,241,730 | McKinney | May 13, 1941 |